Figure 5:
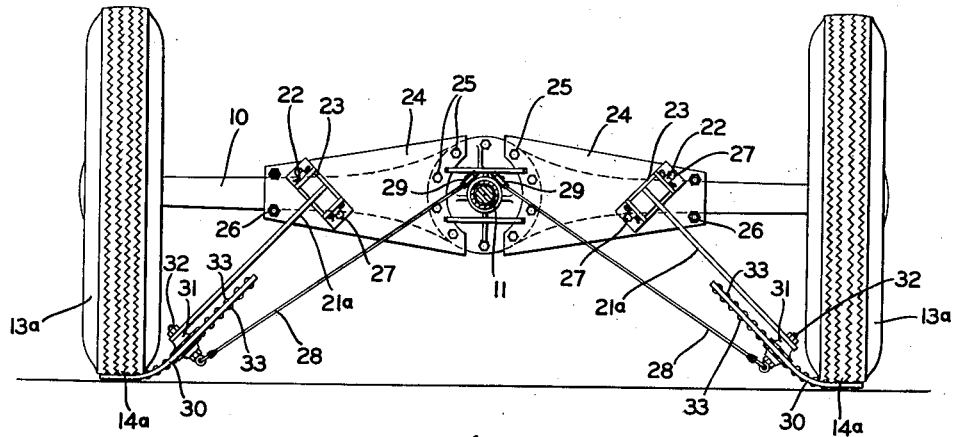

Oct. 23, 1956     E. W. SUTTER     2,767,809
ANTI-SKID DEVICE FOR AUTOMOBILES
Filed March 8, 1954     2 Sheets-Sheet 1
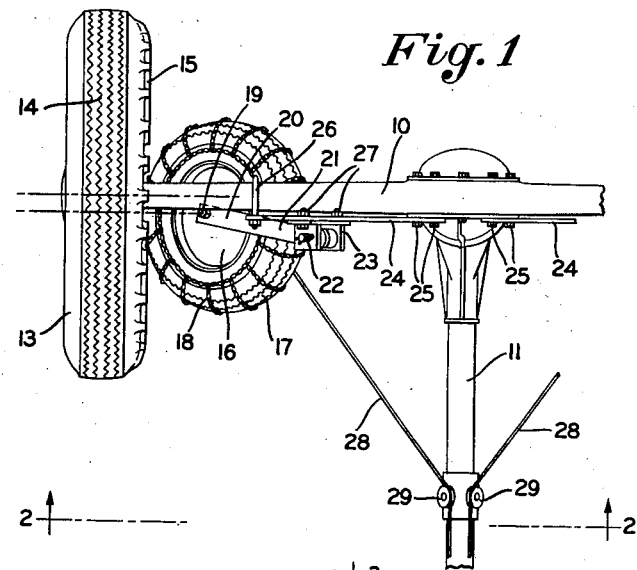
Fig. 1
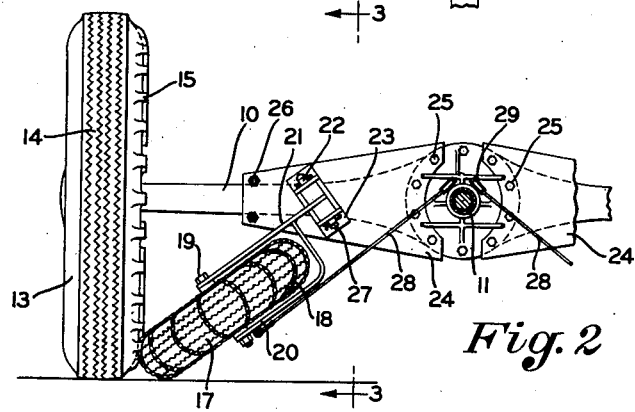
Fig. 2
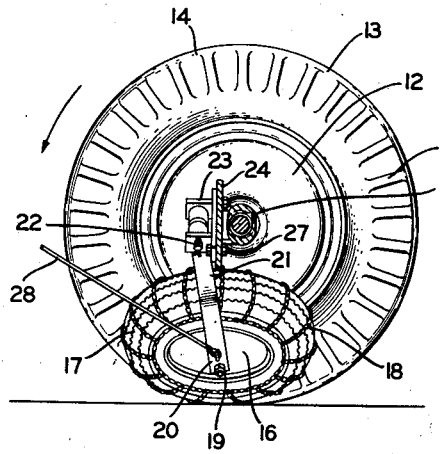
Fig. 3
Fig. 4
INVENTOR.
Edward W. Sutter
BY
Frease & Bishop
ATTORNEYS Oct. 23, 1956  E. W. SUTTER  2,767,809
ANTI-SKID DEVICE FOR AUTOMOBILES
Filed March 8, 1954  2 Sheets-Sheet 2

INVENTOR.
Edward W. Sutter
BY
Frease & Bishop
ATTORNEYS

United States Patent Office 2,767,809
Patented Oct. 23, 1956

2,767,809

ANTI-SKID DEVICE FOR AUTOMOBILES

Edward W. Sutter, near Ashland, Ohio

Application March 8, 1954, Serial No. 414,583

6 Claims. (Cl. 188—4)

The invention relates to devices for preventing skidding of automobiles and similar vehicles, and more particularly to such a device comprising rotary ground-engaging devices adapted to be engaged with the traction wheels of the vehicle.

An object of the invention is to provide angularly disposed, rotatable wheels or discs having gripping surfaces for engagement with the ground and with the traction or driving wheels of the vehicle.

Another object is to provide a device of the character referred to for preventing side skidding and increasing traction of the vehicle.

A further object is to provide such a device comprising a pair of rubber tired wheels having tire chains thereon, and means for disposing said wheels at an angle to, and in contact with, the traction wheels of the vehicle and in simultaneous contact with the ground.

A still further object is to provide an anti-skid device of this type which includes a ribbed tread upon the inner side wall of each traction wheel for engagement with the angularly disposed anti-skid wheels.

Another object of the invention is to provide such a device having means for lowering the anti-skid wheels into contact with the traction wheels and the ground and raising them to inoperative position.

A further object is to provide an anti-skid device of the character referred to, comprising rotatable, flexible discs having gripping surfaces for simultaneous contact with the ground and with the treads of the tires of the traction wheels of the vehicle.

A still further object is to provide such an anti-skid device in which the rotatable, anti-skid devices are arranged to drop by gravity into operative position relative to the ground and the tires of the traction wheels of the vehicle, and comprising means for raising said anti-skid devices to a position spaced from the ground and the traction wheels.

Figures 6, 7:
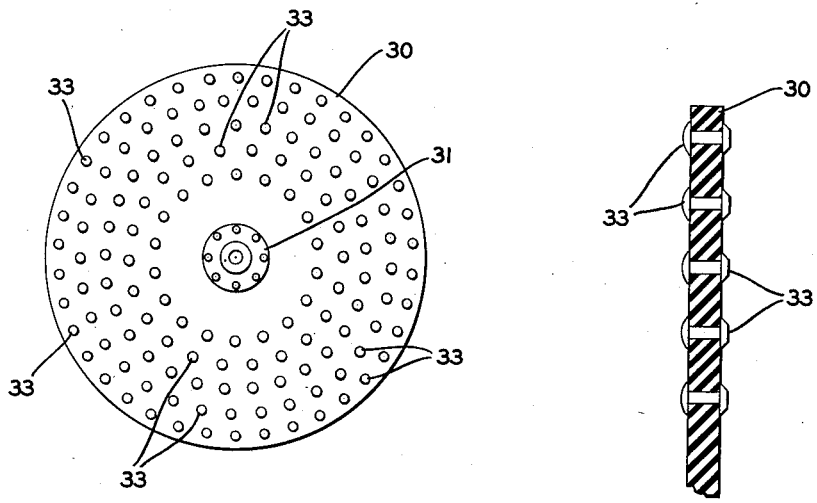

The above objects together with others that will be apparent from the drawings and following description, or which may be later referred to, may be attained by constructing the improved anti-skid device in the manner hereinafter described in detail and illustrated in the accompanying drawings, in which:

Fig. 1 is a top plan view of a portion of the differential housing and one traction wheel of an automobile, showing one of the anti-skid devices cooperating therewith;

Fig. 2 a section, taken as on the line 2—2, Fig. 1, showing the parts in front elevation;

Fig. 3 a section, taken as on the line 3—3, Fig. 2; showing the traction wheel in side elevation and the anti-skid wheel in perspective;

Fig. 4 an enlarged, detached front elevation of one of the anti-skid wheels;

Fig. 5 a front elevation of the differential housing and the traction wheels of an automobile, showing a modified form of the anti-skid device associated therewith;

Fig. 6 an enlarged, detached elevation of one of the flexible, studded discs shown in Fig. 5; and, Fig. 7 a further enlarged, fragmentary section through the disc shown in Fig. 6.

Referring first to the form of the invention illustrated in Figs. 1 to 4, the differential housing of an automobile is indicated at 10, the drive shaft housing at 11 and a traction wheel of the automobile is shown at 12 provided with rubber tire 13.

The usual tread is indicated upon the tire at 14, and for the purpose of the present invention a ribbed tread 15 is preferably formed upon the inner side wall of the tire 13. This side wall tread 15 has the two-fold purpose of providing a suitable friction or gripping surface for engagement with the anti-skid device, as well as resisting wear produced by such engagement.

In the form of the invention shown in Figs. 1 to 4, the anti-skid device comprises a relatively small rubber tired wheel having a conventional tire chain or other suitable gripping surface upon its tread and mounted for angular disposition relative to each traction wheel of the automobile in simultaneous contact with the ground and with the tire of the corresponding traction wheel.

Such a wheel is shown at 16 in the drawings having a rubber tire 17 thereon upon the tread of which is located a conventional tire chain 18. Each wheel 16 is journalled as at 19 in the forks 20 of a bracket 21. Each bracket 21 is pivotally mounted at an angle, by means of a pin 22, to the attaching bracket 23 which is angularly mounted upon a stationary portion of the automobile.

For this purpose, supporting plates 24 may be attached to the differential housing 10, on opposite sides of the center thereof, as by the bolts 25 and U-bolt 26. The attaching bracket 23 may be angularly mounted upon the corresponding plate 24 as by bolts 27.

Any suitable and conventional means may be provided for normally holding the anti-skid wheels in raised position out of contact with the ground and spaced away from the traction wheels of the automobile.

For this purpose cables, or other suitable flexible elements, 28 are shown as connected to the brackets 21 and extending upwardly and forwardly over pulleys 29 and then extending forwardly to a suitable location convenient to the driver where the ends of the cables may be held by any suitable means to retain the anti-skid wheels in raised or inoperative position.

When it is desired to operate the anti-skid device to prevent side skidding of the vehicle as well as to increase the traction of the driving or traction wheels of the vehicle, by preventing slipping or spinning thereof, the cables 28 are released permitting the anti-skid wheels to drop by gravity into the position shown in Figs. 1, 2 and 3, the gripping surfaces of the treads thereof simultaneously contacting the ground and the side wall tread portions 15 of the traction wheel tires.

It will be seen that in this position forward rotation of the traction wheels of the vehicle tends to urge the gripping surfaces of the anti-skid wheels into gripping contact with the ground and with the tires of the traction wheels, so as to prevent slipping or spinning of the traction wheels of the vehicle, thus giving them greater traction.

At the same time, the angular disposition of the anti-skid wheels relative to the road will tend to prevent side skidding of the vehicle in either direction. Thus, upon icy or snow-covered roads, or in mud, the anti-skid wheels may be lowered into contact with the ground and with the traction wheels of the vehicle causing the same to move steadily forward.

When it is desired to raise the anti-skid wheels to the inoperative position, the vehicle should be driven in reverse sufficiently to permit the anti-skid wheels to be disengaged from the tires of the traction wheels of the vehicle, when the cables 28 may be pulled to raise the anti-skid wheels to the upper position where they will provide sufficient road clearance so as not to interfere with normal operation of the vehicle.

Referring now to the modification shown in Figs. 5 to 7, the anti-friction device comprises a pair of rotatable, flexible discs mounted in the same manner as the anti-skid wheels shown in Figs. 1 to 4 and above described, and provided on opposite sides with suitable gripping surfaces for simultaneous contact with the ground and with the tires of the traction wheels of the vehicle.

In this form of the invention the differential housing 10, drive shaft housing 11, attaching plates 24 and attaching brackets 23 are of the same construction as shown in Figs. 1 to 4 and the same reference numerals are applied to these and associated parts. Each of the traction wheels of the vehicle may be provided with conventional tires 13a having the usual treads 14a, rather than the special tires shown in Figs. 1 to 3.

The rotatable, flexible discs 30, which are substituted for the anti-skid wheels of Figs. 1 to 4, may be formed of belting material, sheet metal or other suitable flexible material having sufficient strength and flexibility for the purpose.

Each of these discs is provided with a central hub 31 to receive the axle or shaft 32 by means of which it is journalled to the bracket 21a by means of the pin 22. Suitable gripping surfaces are provided on opposite sides of each disc 30, which may take the form of knobs or the like, as indicated at 33, which may be formed by rivets or the like located through the disc and having heads upon opposite ends.

These anti-skid devices may be normally held in raised position by cables 28 passed over pulleys 29 in the same manner as in Figs. 1 to 4. When in lowered position, as shown in Fig. 5, it will be seen that the flexible discs 30 are of such size and shape and are so positioned that a portion of each disc will extend beneath the tire of the corresponding traction wheel so that the upper gripping surface of the flexible disc will engage the tread 14a of the tire 12a while the lower gripping surface thereof is in engagement with the ground.

Rotation of the traction wheels of the vehicle will cause the flexible discs 30 to continuously rotate beneath the tires of the traction wheels, between the same and the ground. Thus, added traction is provided which will prevent slipping or spinning of the traction wheels of the automobile causing the same to move uniformly forward and prevent side skidding thereof due to the lower gripping surface of the flexible discs being held in gripping contact with the road surface by the weight of the traction wheel thereon.

In order to raise the flexible discs 30 to the inoperative position, it is first necessary to drive the car in reverse sufficiently to release the discs 30 from beneath the traction wheels of the vehicle when they may be raised to the upper position by the cables 28 and held in raised position.

It should also be understood that in both forms of the invention if desired, the forward ends of the cables 28 may be gripped and held against movement by any conventional means, when the anti-skid devices are in the lower or operating positions.

From the above it will be evident that a simple, efficient and easily operated means is provided for preventing side skidding of an automobile or similar vehicle and at the same time giving increased traction so as to prevent slipping or spinning of the driving wheels of the vehicle.

Although the invention is primarily intended for use in connection with the drive wheels of an automobile or similar vehicle, it should be understood that the anti-skid device is also applicable to the rear wheels of trailers and semi-trailers, where it is useful in preventing jack-knifing when the brakes are applied, particularly where the trailer or semi-trailer is going down grade.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In combination with a drive wheel of a vehicle having a rubber tire thereon, a radially ribbed tread on the inner side wall of said tire, a rotatable anti-skid member comprising a rubber tired wheel having a tire chain located around the tread thereof, said anti-skid member being movably mounted on the inner side of the drive wheel and being normally located in downwardly and outwardly disposed angular position with the tire chain thereof in simultaneous contact with the ribbed tread on the inner side wall of the tire of the drive wheel and with the ground at a point spaced inwardly from the drive wheel, and means for moving said anti-skid member out of contact with the ribbed tread and with the ground.

2. An anti-skid device as set forth in claim 1, in which the anti-skid member is so mounted that it will be moved by gravity into contact with said ribbed tread and with the ground.

3. An anti-skid device as set forth in claim 1, in which the anti-skid member is journalled upon a hinged bracket which is so mounted that the anti-skid member will be moved by gravity into contact with said ribbed tread and with the ground.

4. In combination with a vehicle having a pair of drive wheels having rubber tires thereon, radially ribbed treads on the inner side walls of the tires, a pair of rotatable anti-skid members comprising rubber tired wheels having tire chains located around the treads thereof, said anti-skid members being mounted between said drive wheels and being normally located in downwardly and outwardly diverging angular positions with the tire chains thereon in simultaneous contact with the radially ribbed treads on the inner side walls of the drive wheels and with the ground at points spaced inwardly from the drive wheels, and means for moving said anti-skid members out of contact with said ribbed treads and with the ground.

5. An anti-skid device as set forth in claim 4, in which the anti-skid members are so mounted that they will be moved by gravity into contact with said ribbed treads and with the ground.

6. An anti-skid device as set forth in claim 4, in which the anti-skid members are journalled upon hinged brackets which are so mounted that the anti-skid members will be moved by gravity into contact with said ribbed treads and with the ground.

References Cited in the file of this patent

UNITED STATES PATENTS

| | | |
|---|---|---|
| 2,140,606 | Stickles | Dec. 20, 1938 |
| 2,241,923 | Ridgway | May 13, 1941 |
| 2,264,466 | Weisel | Dec. 2, 1941 |
| 2,295,837 | Gerth | Sept. 15, 1942 |
| 2,622,702 | Klein | Dec. 23, 1952 |